United States Patent

Glassen et al.

[11] Patent Number: 5,819,061
[45] Date of Patent: Oct. 6, 1998

[54] METHOD AND APPARATUS FOR DYNAMIC STORAGE RECONFIGURATION IN A PARTITIONED ENVIRONMENT

[75] Inventors: Steven Gardner Glassen, Wallkill; Robert Stanley Capowski, Verbank; Neal Taylor Christensen, Wappingers Falls; Thomas Oscar Curlee, III, Poughkeepsie; Ronald Franklin Hill; Moon Ju Kim, both of Wappingers Falls; Matthew Anthony Krygowski, Hopewell Junction; Allen Herman Preston; David Emmett Stucki, both of Poughkeepsie; Frederick J. Cox, Wappingers Falls, all of N.Y.

[73] Assignee: International Business Machines Corporation, Armonk, N.Y.

[21] Appl. No.: 279,588

[22] Filed: Jul. 25, 1994

[51] Int. Cl.⁶ .................................................. G06F 12/08
[52] U.S. Cl. ..................... 395/406; 395/419; 395/497.04
[58] Field of Search ................................... 395/405, 406, 395/419, 497.01, 497.02, 497.04

[56] References Cited

U.S. PATENT DOCUMENTS

| | | | |
|---|---|---|---|
| 3,737,870 | 6/1973 | Carter et al. | 395/182.05 |
| 4,053,752 | 10/1977 | DeJohn et al. | 371/10.2 |
| 4,430,727 | 2/1984 | Moore et al. | 395/442 |
| 4,601,012 | 7/1986 | Aiken, Jr. | 395/182.13 |
| 4,638,424 | 1/1987 | Beglin et al. | 395/444 |
| 4,783,782 | 11/1988 | Morton | 15/98 |
| 4,843,541 | 6/1989 | Bean et al. | 395/856 |
| 4,868,783 | 9/1989 | Anderson et al. | 395/281 |
| 4,916,605 | 4/1990 | Beardsley et al. | 395/489 |
| 5,038,386 | 8/1991 | Li | 382/302 |
| 5,170,472 | 12/1992 | Cwiakala et al. | 395/828 |
| 5,210,844 | 5/1993 | Shimura et al. | 395/405 |
| 5,220,654 | 6/1993 | Benson et al. | 395/828 |
| 5,253,344 | 10/1993 | Bostick et al. | 395/828 |
| 5,257,368 | 10/1993 | Benson et al. | 395/601 |
| 5,257,376 | 10/1993 | Beck et al. | 395/651 |
| 5,257,379 | 10/1993 | Cwiakala et al. | 395/651 |
| 5,345,590 | 9/1994 | Ault et al. | 395/750 |
| 5,371,848 | 12/1994 | Casey et al. | 395/161 |
| 5,371,867 | 12/1994 | George et al. | 395/405 |
| 5,463,589 | 10/1995 | Gruender, Jr. et al. | 365/230.01 |

FOREIGN PATENT DOCUMENTS

| | | |
|---|---|---|
| 0 257 581 A2 | 3/1988 | European Pat. Off. . |
| 0 472 861 A2 | 3/1992 | European Pat. Off. . |
| 2 256 513 | 9/1992 | United Kingdom . |

OTHER PUBLICATIONS

IBM, "Processor Resource/Systems Manager Planning Guide" GA22–7123–10 Published Aug. 1993.

*Primary Examiner*—Jack A. Lane
*Attorney, Agent, or Firm*—Lynn L. Augspurger

[57] ABSTRACT

In a partitioned process environment, storage is reassigned by a shuffle of guest absolute address spaces which may be reassigned among partitions without restriction as to the position of the space to be reassigned relative to the position of the partition to which it is to be assigned. The reassignment is accomplished by adjusting the origin addresses by an adjustment value corresponding to the size of the address space of an additional memory area to be added to a selected partition. Furthermore, the size of the address space of the selected partition is increased by the same adjustment value. The system employs duplicated origin and limit arrays which are used to convert from a partition (guest) absolute address to a system (host) absolute address and uses duplicated configuration arrays by which the system absolute addresses are converted to physical memory addresses. Revised origin and limit information and configuration information is stored in an origin and limit array in the stand by state and in a configuration array in the stand by state. Autonomously operating circuitry is responsive to control signals to temporarily suspend memory commands from the input-output system, to reconfigure the origin and limit arrays and the configuration arrays to enable the system to use the revised information and, thereafter, to resume the processing of memory commands from the input-output system.

20 Claims, 6 Drawing Sheets

METHOD AND APPARATUS FOR DYNAMIC STORAGE RECONFIGURATION IN A PARTITIONED ENVIRONMENT

BACKGROUND OF THE INVENTION

CROSS-REFERENCE TO RELATED APPLICATIONS

Ser. No. 898,977, filed Jun. 15, 1992, now U.S. Pat. No. 5,452,455 entitled "Asynchronous Command and Support for Shared Channels for a Computer Complex Having Multiple Operating System".

Ser. No. 012,187, filed Feb. 2, 1993, now U.S. Pat. No. 5,459,864 entitled "Load Balancing, Continuing Availability and Reconfiguration Control for an Asynchronous Data Facility".

Ser. No. 014,977, filed Feb. 8, 1993, now abandoned entitled "Multi-Zone Relocation Facility Computer Memory System".

Ser. No. 029,641, filed Mar. 11, 1993, now abandoned entitled "Permanently Non-Preferred Real Storage Frames".

1. Field of the Invention

This invention relates to logically partitioned data processing systems and more particularly to method and apparatus for dynamic reconfiguration of storage in such a system.

2. Background Art

In a logically partitioned data processing system, the system is split into multiple, independently operating partitions. Each partition has an assigned memory area in which the control program defining the partition is stored. Additional memory resources, processor resources and input-output resources may be assigned to each partition on an exclusive or on a shared basis. The IBM enterprise system/ 3090 is an example of a system capable of supporting multiple partitions. Additional background information concerning the IBM system is found in the IBM publication GA22-7123-10 entitled *Processor Resource/Systems Manager Planning Guide* published August 1993.

It is well recognized that partitioning provides a great deal of flexibility. For example, installations may have different partitions active across shifts in a single day or across longer periods for testing and migration to new software and new software versions. Logical partitioning also allows a customer to make maximum use of the physical resources of a machine. Although several logical partitions are executed on the same physical equipment, they have no means of directly communicating with or controlling one another. Typically, operator control of the partitions is provided through a system console which is attached to the system's service processor. Further description of a logically partitioned data processing system is found in European Patent Application document 0 472 861A2, published Mar. 4, 1992.

As system requirements change, new partitions may have to be activated and others deactivated. Some existing partitions may require more storage while others require less. It is therefore desirable to be able to conveniently reassign storage among partitions, preferably with minimal interruption of system operations.

The separation and allocation of physical resources in the above-noted IBM system is supported by the interpretive execution facility of the machine and is performed by internal code called "LPAR." LPAR is a hypervisor or a resource manager and is referred to as the "host." Similarly, the individual partitions are referred to as "guests." In such a system, an amount of contiguous system storage is made available to each of the logical partitions. A partition absolute address space is defined for each partition in terms of partition absolute addresses ranging from zero up to a maximum address. The partition absolute address spaces for all partitions are mapped into a system absolute address space by associating a system absolute origin address and a system absolute limit address with each partition. The origin value for each partition defines wherein the system absolute address space the partition absolute address space begins. The limit value defines where in the system absolute address space the partition absolute address space ends. The system employs a storage configuration array, in the nature of a look-up table, which translates or maps system absolute addresses into physical memory addresses. In the above-mentioned IBM ES/3090 system storage allocated to one or more partitions may be changed dynamically, that is, by a control program initiated by an operator and executed under control of the host and the system's service processor.

In one prior partition process environment, the system absolute address spaces may be added to an existing partition if the space is contiguous to the upper limit of the partition to which it is to be added. A disadvantage of that arrangement is that contiguous space typically does not become available unless a contiguous partition is disabled. An address space less than the complete address space of a partition may be made available by lowering the upper limit for a partition. However, the space made available in this fashion can be used for a new partition. A disadvantage of this arrangement is that address space made available by reducing the upper limit for one partition cannot be added to another existing partition, even if the other partition is a contiguous partition. The concept of this prior arrangement has been expanded in a configuration which allows a partition to access discontiguous system absolute address spaces. This was accomplished by assigning two separate origin addresses and two separate limit addresses. In that arrangement, the free address space created by lowering a partition's limit or by deactivating a partition could be assigned to a non-contiguous partition. A disadvantage of that arrangement is that support is limited to only two contiguous areas. Another disadvantage of that arrangement is that special circuitry has to be provided for each partition which has the dual address space capability. For each absolute address generated by the partition, the circuitry must first determine whether the address falls between the origin and limit of the first address block, and if not, whether it falls between the origin and limit of the second address block. That arrangement is unattractive because of costs and performance constraints.

In another prior partitioned process environment, the absolute address space is preferably twice as large as the corresponding assigned physical memory space. Consequently, the storage configuration array is two times larger than the amount of main storage provided on the system, which typically is no more than 1 GB (gigabyte) with 31 bits of addressing. For 31 bit addressing, 2 G entries had to be provided in the main storage configuration array with half of the entries marked invalid. The unused address space or spaces are referred to as "holes." By using appropriate origin and limit values, the individual partition absolute address spaces may be positioned in the system address space in such a way that there is a hole directly above each partition address space. The absolute address space of a selected partition may be expanded, if additional physical storage becomes available by validating previously invalidated hole addresses. The storage configuration array is rearranged so as to map newly validated absolute addresses associated with the hole into reassigned physical storage. A disadvantage of that prior art arrangement is that the absolute address space has to be statically allocated. Furthermore, the absolute address space had to be twice as great as the physical memory address space in order to be able to accommodate the memory reallocation process. As a result, holes have existed in the absolute address space which are not useable during normal operations and which add to the cost of a system. A further problem with the prior art arrangement is that when sufficient real addressing capability is not available to provide a range of holes in the absolute address space, this type of storage reconfiguration cannot be implemented.

SUMMARY OF THE INVENTION

These and other problems of the prior art are overcome in accordance with this invention by dynamically adjusting origin addresses of various partitions to define new memory areas for as many partitions as may be required, without interfering with the real time functions of the system. In accordance with one aspect of the invention, a method of adding an additional memory area to the memory area assigned to a selected partition includes adjusting by a certain adjustment value the origin addresses for all partitions having an origin address between the selected partition and the origin address of the additional memory area. The adjustment value corresponds to the size of the address space of the additional memory area. Furthermore, the size of the address space of the selected partition is increased by the same adjustment value. The address spaces and origin addresses are defined in terms of system absolute addresses which are mapped into physical memory addresses. The adjusting of origin addresses in the process of reassigning memory areas advantageously does not require movement of data within the physical memories address assignment.

In accordance with the present invention any memory area may be reassigned from any of the partitions to any other of the partitions. Moreover, any portion of a memory area may be assigned to any of the partitions. That is, an available memory area may be divided into sections and the sections may be individually assigned to different partitions. A partition may also be assigned several different memory areas from different other partitions. Advantageously, the available memory area does not have to be immediately adjacent the area to which it is to be added and may be above or below the area to which it is to be added.

In accordance with one aspect of the invention, the system is provided with an origin and limit array storing absolute origin address and absolute limit address information for each of the partitions, and partition address ranges are adjusted by entering revised origin and limit address information in the origin and limit array. In accordance with another aspect of the invention, in a system comprising a configuration array storing physical memory information corresponding to absolute addresses, the method includes entering in the configuration array the physical memory address information which was assigned to those partitions prior to the adjusting of the origin addresses. For the partition to which a memory area is to be added, physical address information includes address information which corresponds to the physical addresses previously assigned to the reassigned memory area.

In accordance with one aspect of the invention, in a system including an input-output (I/O) system generating memory commands and interface circuitry connected to the memory system and the input-output system, revised origin and limit address information and physical address information are first stored in a standby origin and limit array and a standby configuration array, respectively. Subsequent thereto, the origin and limit array and configuration array are reconfigured to enable the system to use the newly stored information. In this manner, memory may be reassigned among partitions without significant interruption of the real time I/O functions of the system.

In one embodiment of the invention, the system is provided with an active and a standby origin and limit array and memory commands from the I/O system include a partition identification and a partition absolute address. The partition identification is used to address both the active and the standby origin and limit array and the output of one of the arrays defining a system absolute origin address is read from the array. The origin address is added to the partition address information to form an expanded memory address which is a system absolute address. The interface circuit includes gating circuitry connected to the active and standby arrays and is conditioned to selectively gate from one or the other of the arrays. In the storage reconfiguration process, revised origin and limit information is stored in the standby array under control of the host processor. In a similar fashion, the system includes an active and a standby configuration array used in mapping from system absolute addresses to physical memory addresses and the standby configuration array is loaded with revised information under control of the host processor. The interface circuitry is provided with autonomously operating control circuitry responsive to a signal from the service processor 104 to suspend the handling of the memory commands from the I/O system and to control the state of gating circuitry of both the origin and limit arrays and the configuration arrays to cause the gating circuitry to gate information from the array which was previously designated as standby and contains the revised information. Thereafter, the control circuit autonomously generates an appropriate signal to resume the processing of memory commands. During the time that the processing of memory commands from the I/O system is suspended, the I/O system preferably queues any memory commands and the reassignment of memory among partitions is accomplished without apparent interruption of the critical functions of the system.

BRIEF DESCRIPTION OF THE DRAWINGS

An embodiment of the invention is described with reference to the drawing in which.

DETAILED DESCRIPTION

This specification incorporates by reference the entire specification and drawings of the following co-pending U.S. patent applications: Ser. No. 012,187, filed Feb. 2, 1993 entitled "Load Balancing, Continuing Availability and Reconfiguration Control for an Asynchronous Data Facility"; Ser. No. 014,977, filed Feb. 8, 1993 entitled "Multi-Zone Relocation Facility Computer Memory System".

Figure 1:
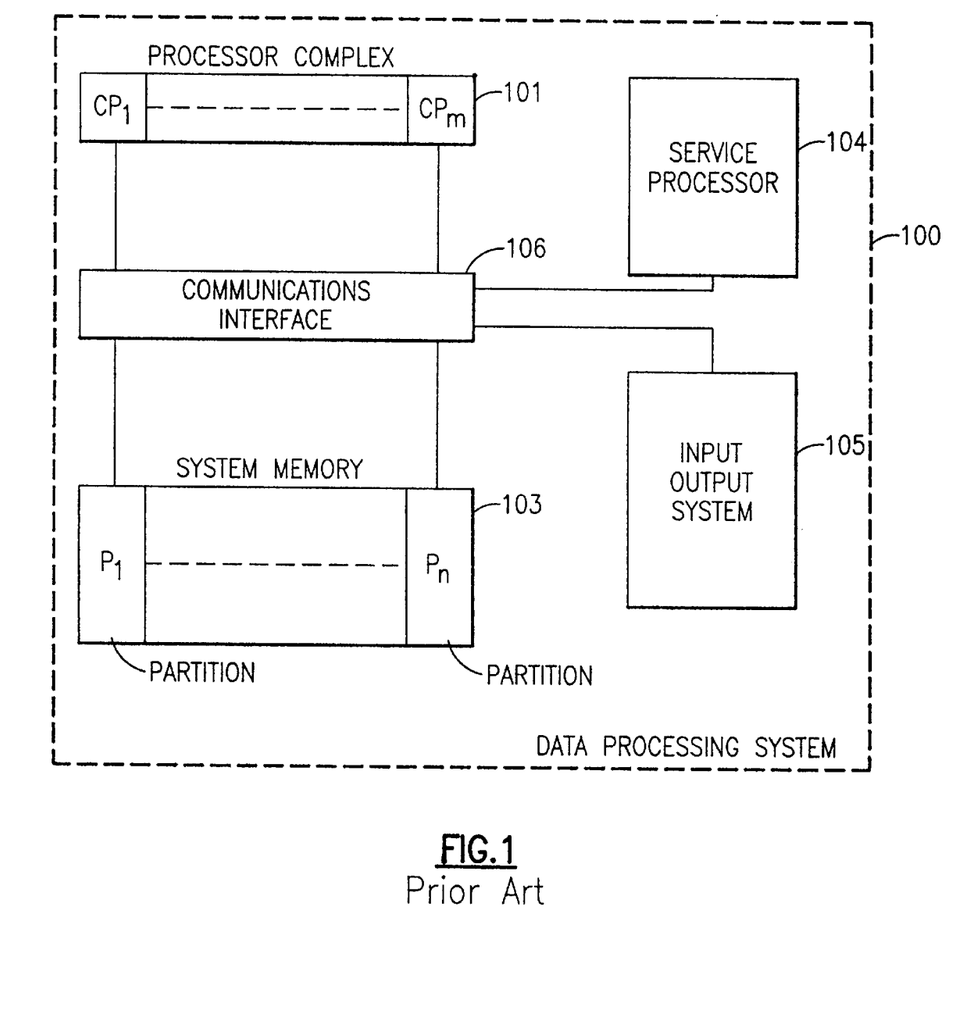
FIG. 1 is a schematic representation of a prior art data processing system employing a plurality of partitions.

FIG. 1 is a block diagram representation of a prior art data processing system 100 arranged as a partitioned computing system. The system includes a processor complex 101 connected to a system memory 103 and an input/output system 105 via a communications interface 106. The system memory 103 is divided into several subsections, each assigned to a partition for the storage of control programs and data pertaining to the associated partition. Each partition will have one more of the central processors CP1 through CPm of the processor complex 101 assigned to it. The input/output system 105 comprises a plurality of input/output channels and each of the partitions has certain of the input/output channels assigned to it. Processors and input/output channels may be assigned to a partition on an exclusive basis or on a shared basis with other partitions. The service processor 104 is connected to the various system components for maintenance and control purposes. The communications interface 106, connected to the processor complex 101, the system memory 103, the service processor 104, the input/output system 105, includes a system bus and memory and I/O communications controllers and provides for communications among the various parts of the system.

Figure 2:
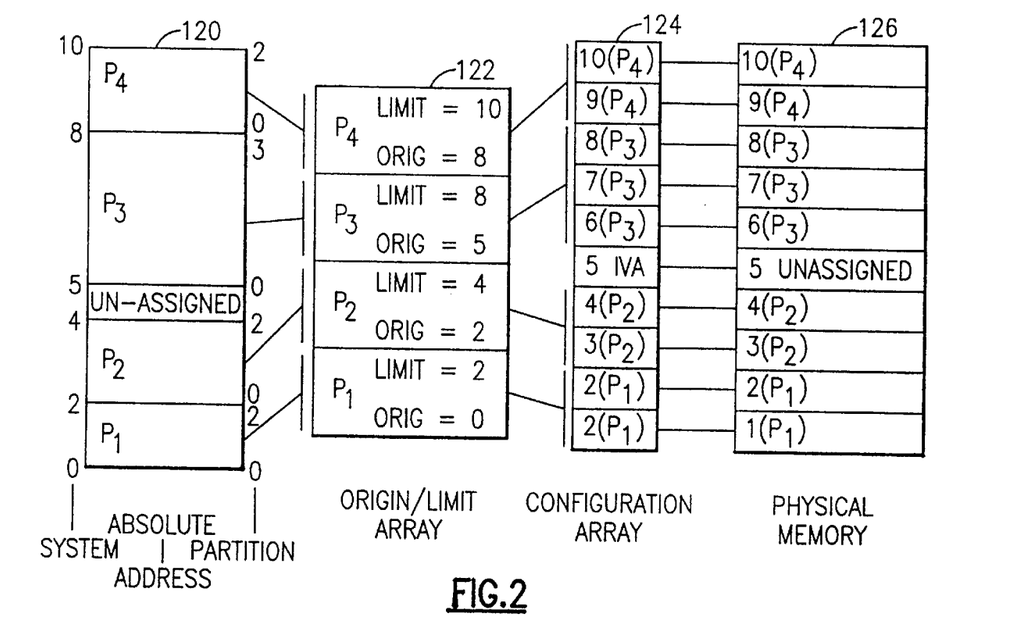
FIGS. 2 and 3 show a set of tables representing relationships between absolute address space and physical memory space before and after storage reconfiguration in accordance with the principals of this invention.
Figure 3:
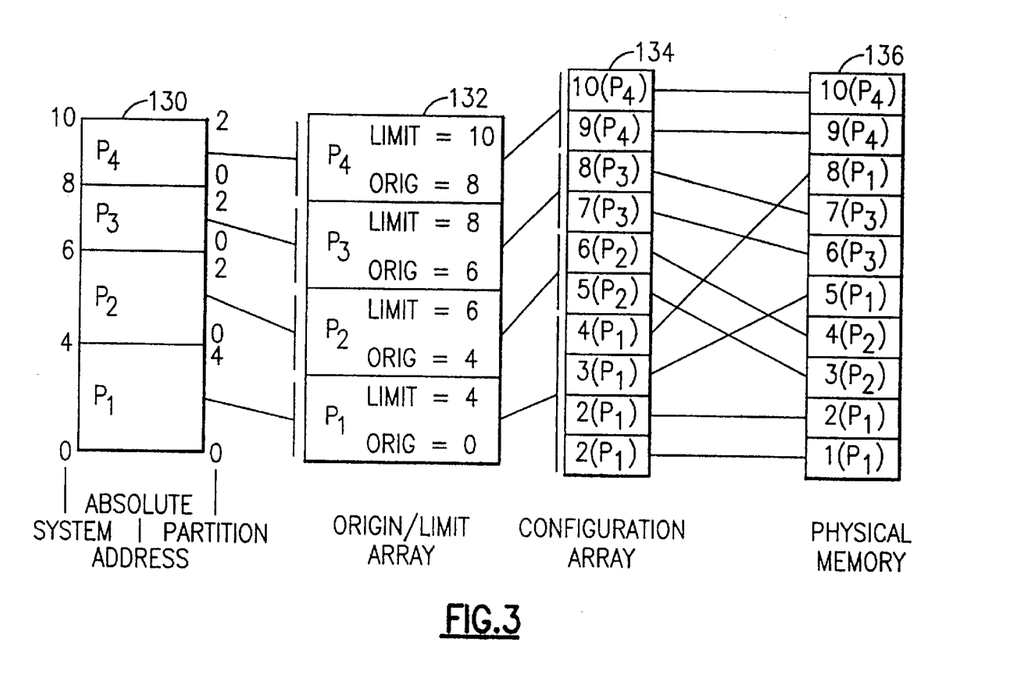

FIGS. 2 and 3 illustrate a storage reconfiguration including a remap or shuffle of addresses in accordance with the present invention, which does not require that a reassigned memory area be contiguous to the memory area of the partition to which it is assigned. FIG. 2 illustrates a typical pre-shuffle memory assignment. FIG. 3 illustrates the post-shuffle memory assignments. FIGS. 2 and 3 represent an example of a memory shuffle wherein the original arrangement includes four separate partitions, P1 through P4, each having an assigned portions of the physical memory, and wherein portions of the physical memory are reassigned. System absolute addresses for partitions having absolute addresses falling in the range of absolute addresses between the origin address of the address area to be reassigned and the limit address of the partition to which the area is to be assigned, will be modified. However, the physical memory area for the unmodified partition does not change. Table 126 in FIG. 2 shows the initial physical memory assignment in which partition P3 has been assigned three blocks of memory and partitions P1, P2, and P4 have each been assigned two blocks of memory. Additionally, there is an unassigned memory block. Table 136 in FIG. 3 shows the desired physical memory reassignment such that a portion of the memory previously assigned to partition P3 is assigned to partition P1 together with the unassigned portion of the memory. It will be understood that the memory blocks illustrated in Tables 126 and 136 may be in a convenient memory block size, such as 1 MB (megabyte) or 1 GB (gigabyte) or another convenient block size.

Table 120 in FIG. 2 shows the existing system absolute address assignment, along the left edge of the table. It shows for example that addresses in the range of 0–2 (e.g. megabytes) is assigned to partition P1, addresses in the range of 2–4 are assigned to P2, addresses in the range of 5–8 are assigned to P3, and addresses in the range of 8–10 are assigned to P4, while addresses in the range of 4–5 are unassigned. The partition absolute address space for each partition is shown along the right hand edge of the Table 120. The partition absolute address spaces each start at 0 and extend to the upper limit address. Thus, the partition absolute address space for partition P1 extends between 0 and 2, and the partition absolute address space for P3 extends between 0 and 3, while the system absolute address space for the system extends from 0 to 10. Each of the partitions uses the absolute addresses within its range to address a memory. However, before the addresses are applied to the physical memory, they are applied to an origin/limit array, as represented in Table 122 and FIG. 2. By means of the origin/limit array, an absolute address origin value is assigned to the partition absolute address. The limit information is used as an address validity check after a partition absolute address has been combined with the proper origin address. In the present embodiment, the partition absolute address for partition P1 equals the system absolute address. The system absolute address is applied to a configuration array represented by Table 124 in FIG. 2. The configuration array stores physical memory addresses and contains an entry defining a physical memory address for each system absolute address generated from the origin/limit array. In the arrangement of FIG. 2, each numbered block of the configuration array of Table 124 contains physical memory addresses in correspondingly numbered blocks of the physical memory depicted on Table 126. Block 5 is an exception in that it is associated with an unassigned area and contains an invalid address.

In the present example, one of the blocks of physical memory previously assigned to the partition P3, e.g., block 8, and the unassigned memory block, block 5, are assigned to partition P1. Table 136 indicates that block 8, previously assigned to partition P3 has been reassigned to partition P1, as well as the previously unassigned memory block, block number 5. As can be seen from Table 130, the system absolute address space has been reconfigured such that the partition P1 now has four address blocks while the partition 3 has two address blocks, and the unassigned area no longer exists. A comparison of Table 122 of FIG. 2 and Table 132 of FIG. 3 shows how the changes which have been implemented in the origin/limit array. The partition P3 now has the origin 6 and limit 8, and the partition P2 has the assigned origin of 4 and the limit of 6, while the limit for partition P1 has been changed from 2 to 4. The addresses for P4 are unchanged. As stated earlier, in the configuration array of Table 124 (FIG. 2) physical memory addresses are stored within a correspondingly numbered block of physical memory shown in Table 126. Tables 134 and 136 represent the configuration array and physical memory addresses after the address reassignment. As can be seen, configuration table array entries 1, 2, 9, and 10 contain addresses of correspondingly numbered blocks of the physical memory and were not affected by the memory reassignment. However, as can be seen from Table 130, either origin or limit, or both in the system absolute addresses for partitions P1, P2, and P3 were moved. Block 3 and 4 of the configuration array, Table 134, are now assigned to P1 and contain the addresses of blocks 8 and 5, respectively, of the physical memory shown in Table 136. The configuration array blocks 5 and 6, now assigned to partition P2, contain the addresses of physical memory blocks 3 and 4, respectively, which were previously assigned and continue to be assigned to partition P2. Similarly, configuration array blocks 7 and 8 are now assigned to partition P3 and contain the addresses of physical memory blocks 6 and 7, respectively, which continue to be assigned to P3. Thus, it is apparent that a reassignment of memory has reoccurred without any rearrangement of physical memory or the need for "holes" in the address space.

Figure 4:
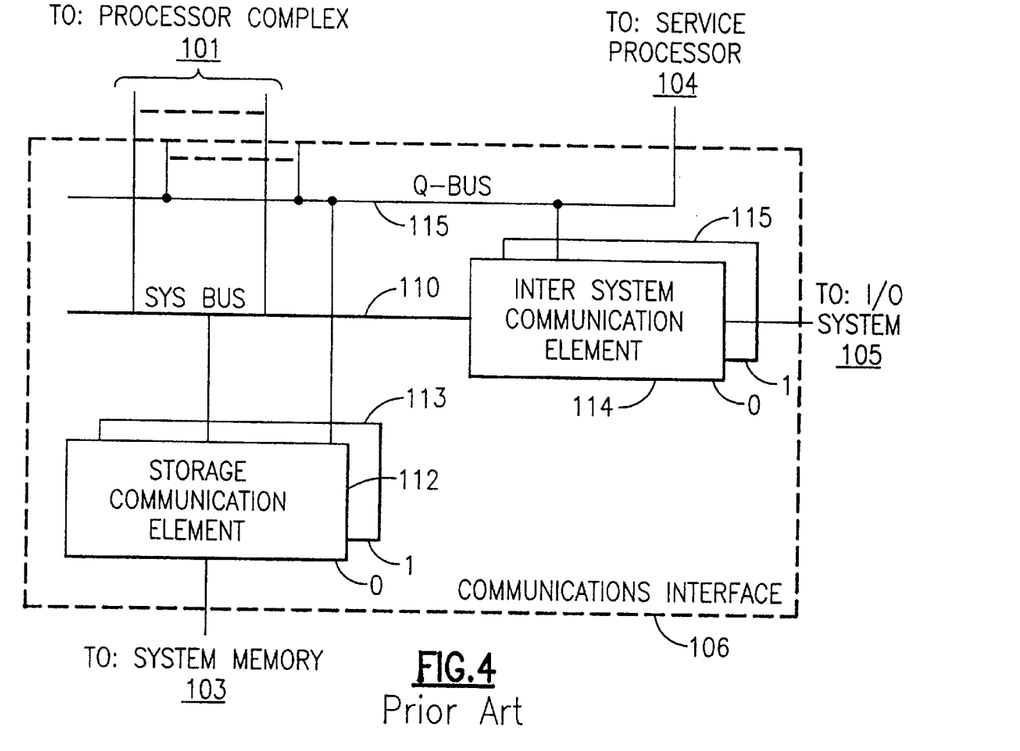
FIG. 4 is a block diagram representation of the communications interface of FIG. 1.

FIG. 4 is a block diagram representation of the communications interface 106 of FIG. 1. The communications interface 106 includes a system bus 110 which is connected to the processor complex 101 and to at least one storage communication element (SCE) 112 and at least one intersystem communication element (ICE) 114. The SCE 112 provides a communications interface to the system memory 103. The ICE provides a communication interface between the processor complex 101 and the input/output system 105 as well as the memory system 103 via the SCE 112. In some prior art systems, the processor complex, the input/output system and the memory system may be divided into two or possibly more independently operating systems. In such an arrangement, the storage communication element (SCE) and the intersystem communication element (ICE) are duplicated, each operating essentially autonomously. FIG. 4 depicts a dual system wherein in SCE 112 is designated as the "0" storage communication element and SCE 113 is designated as the "1" storage communication element and wherein ICE 114 is designated as the "0" intersystem communication element and ICE 115 is designated as the "1" intersystem communication element. In this illustrative embodiment, the invention will be described with respect to a "simplex" system employing a single SCE 112 and a single ICE 114, with reference to a multiple SCE, ICE arrangement when appropriate.

Figure 5:
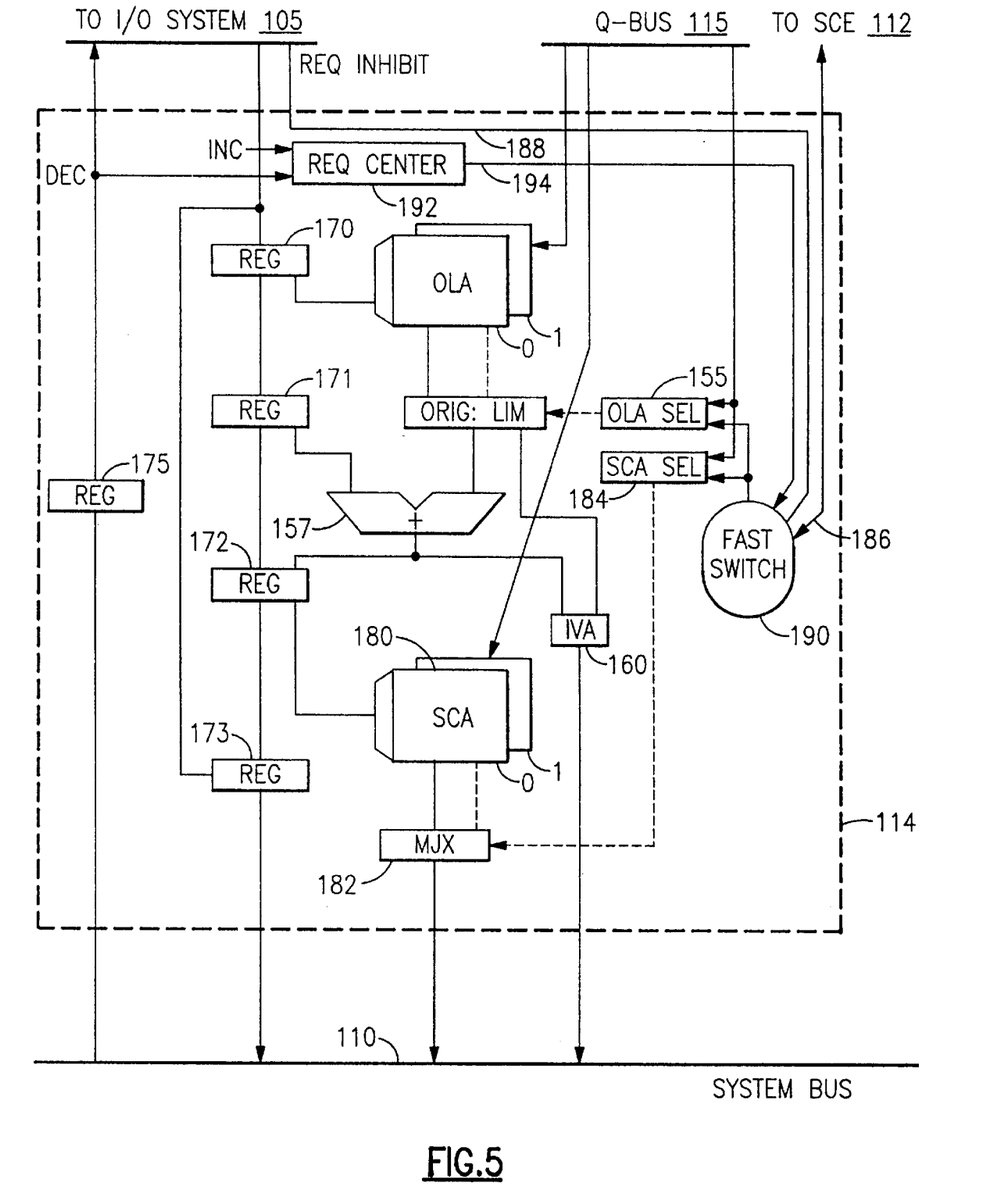
FIG. 5 is a block diagram representation of an intersystem communication element including circuitry employed in dynamic storage reconfiguration in accordance with the invention.

FIG. 5 is a block diagram representation of certain elements of the ICE 114 relating to the invention. In normal operation, the ICE 114 interfaces with the I/O system 105 and the system bus 110. As mentioned earlier herein, the data processing system 100 may be partitioned to form a plurality of logical partitions or logical machines and a portion of the system memory 103 is uniquely assigned to each logical partition. The various partitions are defined in terms of absolute system addresses and each partition has an assigned origin address and a limit address. Within each partition, partition absolute addresses are assigned ranging from zero up to a predefined address. The ICE 114 receives storage requests from the I/O System 105 with memory addresses defined in terms of partition absolute addresses and accompanied by a partition ID. The ICE 114 adds a partition origin address, corresponding to the partition ID, to the partition absolute address to provide a system absolute address. The derived absolute address is checked against the assigned limit address value. If the address falls within the valid limit, the ICE forwards the storage request to the SCE 112 with the derived system absolute address, via system bus 110. The absolute system addresses are converted to physical memory addresses by the SCE.

The ICE 114 includes a plurality of registers 170–173 into which the storage requests from the I/O System 105 are gated. The address bits defining the identity of the logical partition are gated from register 170 to the origin and limit array (OLA) 150. The OLA 150 is duplicated and has a 0 side and a 1 side, both typically containing the same information. The two sides of the OLA 150 each contain an addressable entry for each active partition ID and each such entry contains a number of bits defining an origin address and a limit address, along the lines depicted in Tables 122 and 132 of FIGS. 2 and 3. The stored origin address corresponds to the system absolute origin address for the particular partition and the limit address corresponds to the highest system absolute address assigned to the particular partition.

When the OLA 150 is addressed, both sides of the OLA gate the appropriate data to a multiplex circuit 152. The output of one of the two sides is gated through the multiplex circuit under control of the OLA select circuit 155. In this manner, the origin information obtained from the selected side of the OLA is gated to an adder circuit 157 where it is added to a partition absolute address stored in register 171. The output of the adder circuit 157 represents the system absolute address, which is gated to register 172. The limit information is gated from multiplex circuit 152 to an invalid address checker 160. The system absolute address generated in the adder circuit 157 is also forwarded to the invalid address checker 160 where it is compared to the limit information obtained from the OLA 150. An invalid address signal is asserted on the system bus 110 in case the system absolute address exceeds the limit address. The new address information is gated from register 172 to register 173 and merged with other memory request information in register 173 for transmission to the SCE 112 via the system bus 110. In response to each request transmitted from the ICE 114 to the SCE 112, the SCE provides a response on system bus 110 which is gated to register 175 of the ICE 114 and from there to the I/O system 105.

In systems using multiple intersystem communication elements (ICE) and multiple storage controller elements (SCE) the ICE must include additional address information defining the identity of the SCE to which the request is to be transmitted. To that end, the ICE 114 is provided with a storage configuration array (SCA) 180. Specified bits of the system absolute address in register 172 are used to address entries in the SCA 180 which store address information to selectively address the appropriate SCE. As in the case of the OLA 150, the SCA 180 is duplicated, having a 0 and a 1 side which typically store identical information. The output of both sides is applied to a multiplex circuit 182 which, under control of an SCA selector 184, selectively gates the output from either the 0 or the 1 side to the system bus 110.

In dynamic storage reconfiguration, as stated earlier herein, the origin and limit addresses for the various partitions may be changed. That requires that the OLA 150 be updated with new address information to accommodate the reconfigured memory arrangement. The 0 and 1 sides of the OLA 150 may be separately written into under control of the service processor 104 via the queue bus 115. The OLA selector 155 and the SCA selector 184 are preset under control of the service processor 104 via the queue bus 115. During the storage reconfiguration procedure, as discussed further in subsequent paragraphs, the service processor 104 may for example, set the selectors 155 and 184 to treat the 1 side of the OLA 150 and of the SCA 180 as the active side. The respective 0 sides of the OLA 150 and the SCA 180 may then be loaded with new address information required for the reconfigured system via the queue bus 115, without interfering with the normal handling of storage requests.

The ICE 114 further includes an autonomously operating state machine referred to as the fast switch 190. As explained further later herein, the service processor 104, operating under control of the host or hypervisor performs a number of functions, including the quiescing of the central processor of processor complex 110 and preparing other parts of the system for a switch-over to the new memory configuration using new addresses for the various partitions. Also included in those functions is communicating with the SCE 112, to cause the SCE 112 to be set up for a switch-over to the new configuration with new memory addresses. Prior to making the switch-over in the SCE 112, however, the SCE sends a SWAP command to the fast switch 190 via a private bus 186. The fast switch 190 responds to this command by transmitting a signal to the I/O system 105 via private bus 188 inhibiting the I/O system from sending further storage requests. The ICE 114 is provided with a request counter 192 which is incremented each time a request is received from the I/O system 105 and which is decremented each time a response is forwarded from the ICE 114 to the I/O system 105. In this manner the request counter provides an indication of the number of requests in process.

The fast switch 190 is connected to the OLA selector 155 and the SCA selector 184. These selectors include circuitry defining the states of the associated arrays which is set under control of the service processor 104 via the q-bus 115. For each array, the selector circuit can define four possible states: on-line, off-line, primed on-line, and primed off-line. In the on-line state, the array, i.e., side zero or side one, is active and the output of that array is used in request processing by the ICE. In the off-line state, the contents of the array are not usable by the system and it is enabled for writing via the queue bus. The primed on-line state is the same as the on-line state except that the circuit has been enabled such that it will respond to a signal from the fast switch 190 to be switched to the off-line state. Similarly, the primed off-line state is the same as off-line except that it is enabled to be switched to the on-line state in response to a signal from the fast switch 190. As discussed earlier, in the dynamic reconfiguration process, one side of the duplicated OLA 150 and SCA 180 are loaded with updated information. This takes place in the off-line mode. Upon completion of that loading operation, the service processor 104 sets the OLA selectors 155, 184 such that the sides of the arrays with the prior information are in the primed on-line state and the sides of the arrays with the updated information are in the primed off-line state.

The request counter 92 is connected to the fast switch 190 via local bus 194 and when all outstanding requests have been served, as indicated by the state of the request counter, the fast switch 190 signals the OLA selector 155 and the SCA selector 184 to switch the primed on-line arrays to the off-line state and to switch the primed off-line arrays to the on-line state. The fast switch 190 then transmits a Complete signal to the SCE via the private bus 186. The ICE 114 is now in a quiescent state and will remain in this quiescent state until a further signal is received from the SCE 112 on private bus 186 indicating that SCE 112 is prepared to receive further requests. In response, the fast switch 190 sends a signal to the I/O system-105 via the private bus 188 indicating that further requests can be accepted.

The I/O system 105 typically includes a multiplicity of channels and a multi-channel stager in which requests are queued before they are transmitted to the ICE 114. Thus, inhibiting requests from the IO system by the ICE 114 will not result in any interruption of the operation of the input/output system unless the time required for the switch-over exceeds certain model-dependent I/O controller timing characteristics. The total time required to perform the switch-over from one storage configuration to another, is primarily a function of the period of time required in the ICE to wait for outstanding requests to be completed by the SCE 112 and the actual switching to the new address configuration. This time period is typically considerably shorter than the timing limits of the I/O controller.

Figure 6:
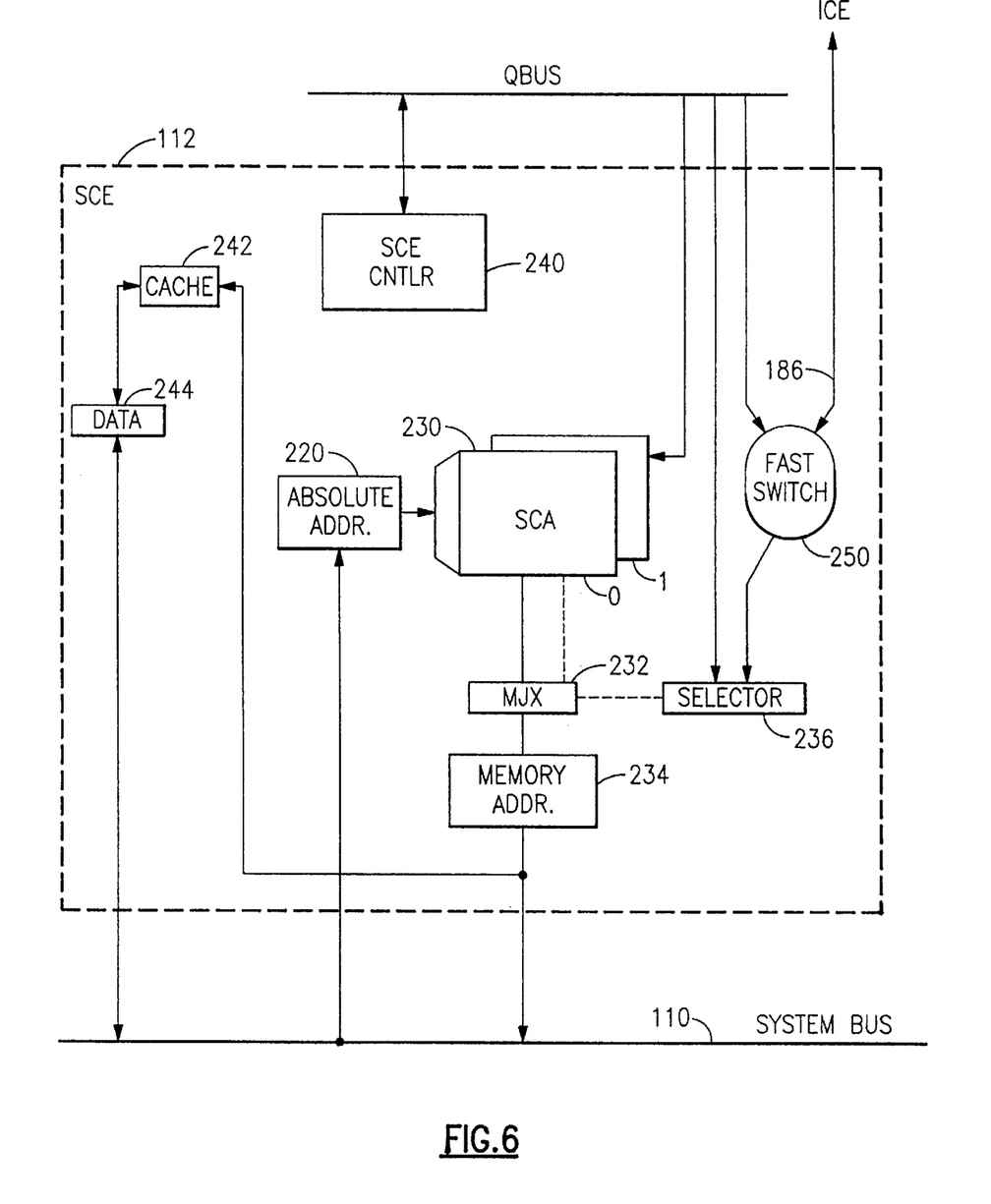
FIG. 6 is a block diagram representation of a storage communication element including circuitry employed in dynamic storage reconfiguration in accordance with the invention.

FIG. 6 is a block diagram representation of certain elements of the SCE 112 relating to the invention. In normal operation, the SCE 112 receives memory requests from the ICE 114 via the system bus 110. The memory requests will include an absolute address which may be entered in the absolute address register 220. This address is used to address the storage configuration array 230. As stated earlier, the storage configuration array contains a physical memory address for each absolute address. The physical memory address is read from the SCA 230 via a multiplex circuit 232 to a memory address register 234. The SCE 112 has an SCE controller 240 and a cache memory 242. The SCE controller 240 controls the normal operations of the SCE 112, which includes addressing the cache and addressing the system memory 103 via system bus 110 in the event of a miss in the cache 242. Data register 244 provides a data interface between the system bus 110 and a cache 242.

The storage configuration array 230 is duplicated and comprises a 0 side and a 1 side which may be used in an active/standby configuration. Typically, both sides are addressed from the address register 220 and the output of 1 side is gated to the memory address register 234 via the multiplexer 232 under control of a selector circuit 236. The state of the selector circuit may be changed under control of the service processor 104 via the queue bus 115 and from the fast switch 250. For each of the SCA arrays, selector circuit 236 can define four possible states: on-line, off-line, primed on-line, and primed off-line. In the on-line state a particular array is active and the output of that array is gated through the multiplexer 232. In the off-line state, the output of the array is disabled. The primed on-line and the primed off-line are the same as the on-line and off-line states, respectively, except that the selector circuit 236 has been enabled as such that it will respond to a signal from the fast switch 250 to be switched to the opposite state, e.g., from primed on-line to off-line. In dynamic storage reconfiguration, the selector 236 is set such that 1 of the sides of the SCA 230 is in the off-line state. The off-line side is then loaded with new information via the queue bus 115 and the selector is set to define the primed off-line state for the updated side and the primed on-line state for the other side of the SCA 230. The fast switch 250, similar to the fast switch 190 in the ICE 114, comprises an autonomously operating state machine. The fast switch 250 responds to a signal received via the queue bus 115 to perform a number of functions, including transmitting a SWAP command to the fast switch 190 in ICE via private bus 186. After receiving a response from the ICE 114 indicating that the ICE is in the quiescent state, the fast switch 250 provides a signal to the selector 236 to cause the selector 236 to change state such that the previously off-line side of the SCA 230 becomes the on-line side and the previously designated on-line side becomes the off-line side. The fast switch 250 then sends a resume signal to the fast switch 190 in ICE 114. The SCE controller 240 is connected to the queue bus 115 and receives commands from the queue bus to perform certain functions in the connection with the dynamic reconfiguration process, as are described in the following paragraphs with respect to dynamic storage reconfiguration execution.

Figure 7:
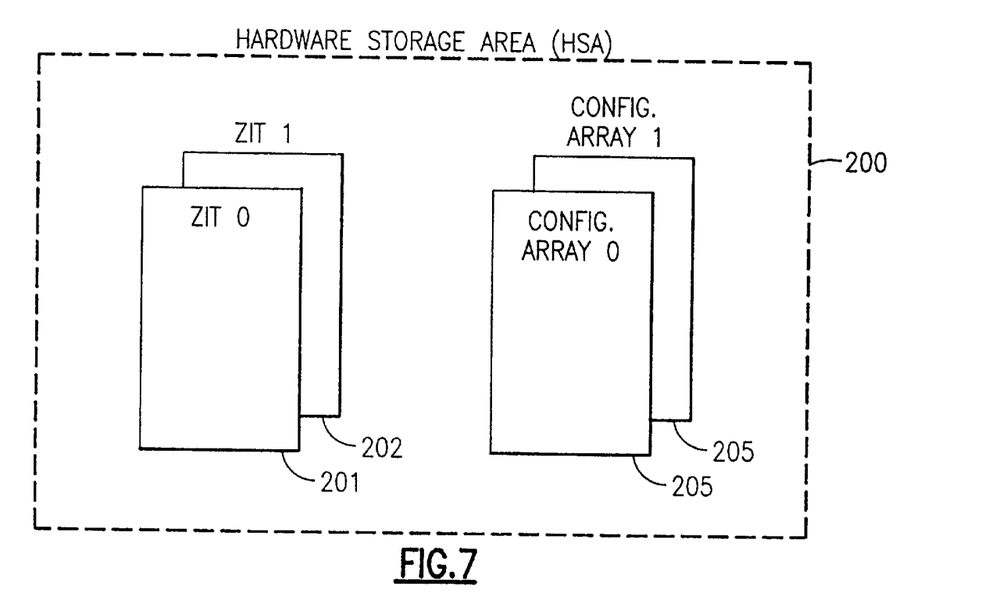
FIG. 7 is a block diagram representation of an area of memory showing duplicated zone information tables and configuration arrays.
Figure 8:
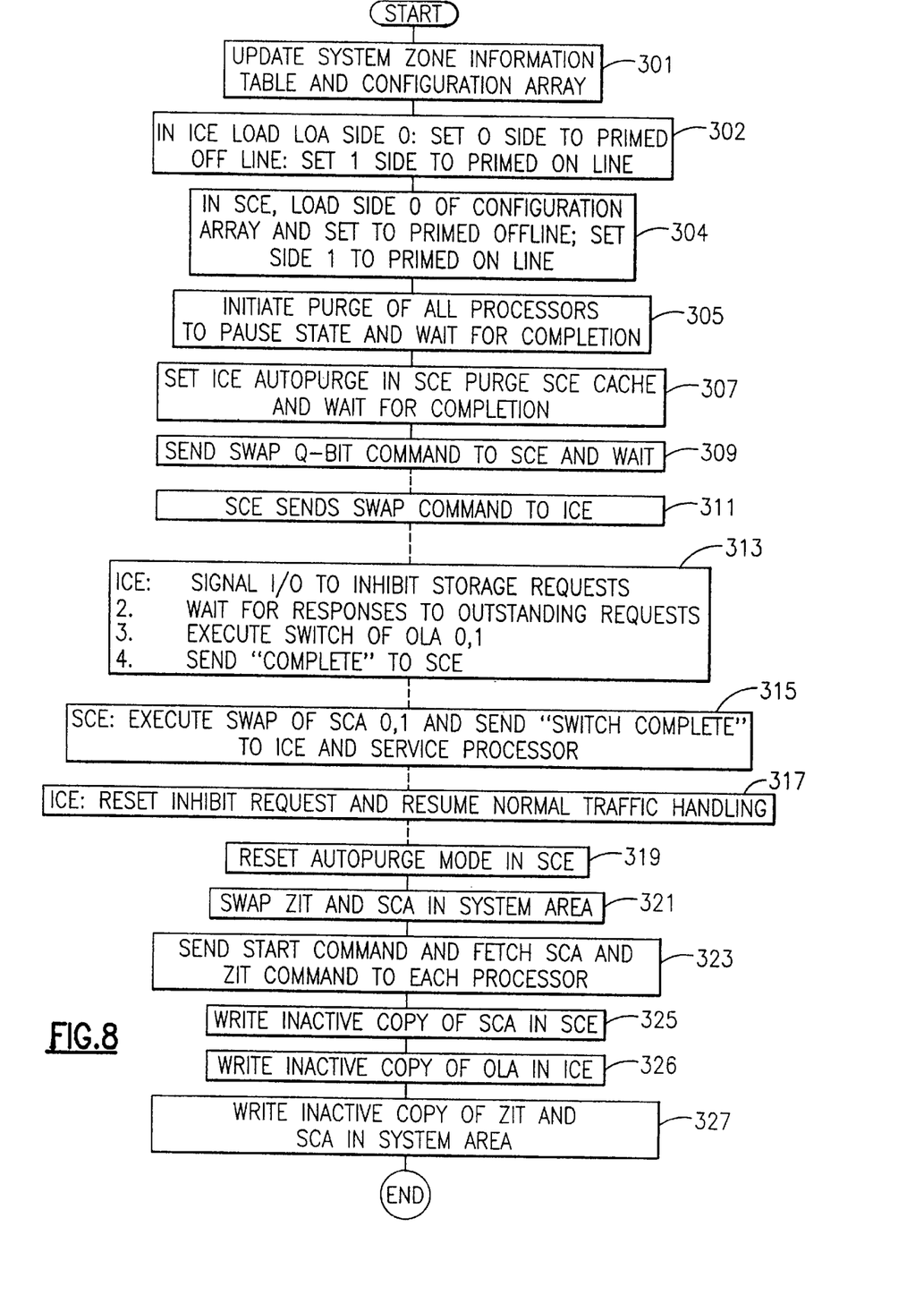
FIGS. 8 is a flowchart representation of functions performed under control of a host processor to implement dynamic storage reconfiguration in accordance with the invention.

FIG. 8 is a flowchart representation of a single host partition instruction which executes dynamic storage reconfiguration in cooperation with service processor 104 and state machines in SCE 112 and ICE 114 of the partitioned system. The single instruction executes a series of instructions from microcode stored in a designated area of main memory referred to as the hardware storage area. The hardware storage area includes system configuration and other system information for use by the host. Included in the hardware storage area is a zone information table (ZIT)

defining the areas of memory assigned to each of the partitions and a configuration array defining the relationship between system absolute memory addresses and physical memory addresses. In accordance with principles of this invention, both the zone information table and the configuration array in the hardware storage area are duplicated. This is depicted in FIG. 7 showing a 0 zone information table and a 1 zone information table 1, labeled 201 and 202, respectively, and a 0 configuration array and a 1 configuration array labeled 205 and 206 respectively.

The flowchart of FIG. 8 represents the functions performed by the system to accomplish a dynamic storage reconfiguration along the lines described earlier herein with respect to FIGS. 2 and 3. In preparation for execution of the reconfiguration instruction, new origin and limit information has to be provided defining each of the partition zones in the new configuration. This information is derived in a manner similar to that described with the example depicted in FIGS. 2 and 3 and as can be observed from a comparison of Tables 122 and 132 of these figures. Furthermore, configuration array data, i.e. the translation between absolute addresses and physical addresses, has to be provided. The principles of deriving the new information are evident from a comparison of Tables 124 and 134 of FIGS. 2 and 3.

Initially, one of the zone information tables 201, 202, 162 (FIG. 7) may be designated as inactive and similarly one of the configuration arrays 205, 206 may be designated as inactive. As an initial step in the execution of the reconfiguration instruction, the inactive copy of the zone information table and of the configuration array in the hardware storage area (FIG. 7) are updated. For the sake of simplicity of this description, it is assumed that the 0 zone formation table 201 is marked inactive and updated and similarly, that 0 configuration array 205 is updated at this point. It will be understood that it is arbitrary as to whether the 0 side is updated first. The updating of the 0 zone information table and the 0 configuration array, in the hardware storage area, is depicted in block 301 of FIG. 8.

As a next step, one side of the OLA 150 in the ICE 114 will be provided with the new information stored in the 0 zone array table 201 in the hardware storage area, defined in terms of new origin and limit information for each logical partition. For the purposes of this example, it is assumed that the zero side of OLA 150 is in the off-line mode and will be loaded by the service processor 104 with the new information. Thereafter, the OLA selector 155 is configured to set the zero side of OLA 150 to the primed off-line state and to set the one side of the OLA 150 to the primed on-line state. This is indicated in block 302 of FIG. 8. In a similar fashion, the zero configuration array in SCE 112 is updated and the SCA selector in the SCE 112 is configured to set the zero side of the configuration array to the primed off-line state and to set the one side to the primed on-line state. This is represented by block 304 of FIG. 8.

As a further step in the process, a PURGE instruction is sent out to each of the processors of the processor complex 101. The purpose of the PURGE instruction is to purge the local cache in each of the processors such that all data to be written into memory is written in memory at this time and other data is invalidated. This instruction will cause each of the processors to clear any local tables defining conversion between virtual and absolute addresses since certain absolute addresses will be changed in the execution of reconfiguration instruction. The individual processors are instructed to enter a pause state upon completion of the purge operation, as depicted in block 305 of FIG. 8.

After all of the processors have entered the PAUSE state, as indicated in block 305, the command is sent out to the SCE 112 to place that unit in the ICE AUTO PURGE mode, as indicated in block 307. In this mode, the SCE, in effect, purges the cache 242 with every memory request from the ICE 114. The SCE is also instructed to perform a purge of SCE cache 242 whereby all updated information is written in system memory 103 and other information is effectively deleted. Furthermore, the SCE may be instructed to mark a "PAGER BUSY" condition which prohibits it from accepting any further paging commands. Other special modes or activities may be inhibited. The SCE may have a "LOCK REGISTERS" feature whereby a particular requesting device may obtain exclusive access to a particular block of storage. The SCE is instructed to make LOCK REGISTERS busy, causing new requests for this service to be rejected. Since it is important that I/O functions be handled with a minimum of interruptions, the SCE is not paused. Rather, its operated in a mode in which memory commands coming to it from the ICE are handled without retaining information in the cache.

In a system configuration in which two storage communication elements and two I/P communication elements are provided, each SCE must be purged. As described further in the following paragraphs, the SCE transmits control signals to the ICE to cause the ICE to switch to the updated OLA and SCA. In the event that there are a plurality of SCEs and a plurality of ICEs, one of the SCEs is designated as a master SCE and the master SCE sends out the instructions to all ICEs and the other SCEs to cause all of the ICEs and SCEs to switch from the updated OLAs and SCAs, thereby causing all ICEs and SCEs to be updated to the new partition configuration.

As indicated in block 309 in FIG. 8., the SCE receives the SWAP-Qbit command. It receives this command via queue bus 115 from the service processor 104 which executes the various reconfiguration functions in response to a command from the host processor. The service processor waits for a response from the ICE, as indicated in block 309. In response to receipt of the SWAP-Qbit command, the SCE fast switch 250 (FIG. 6) sends a SWAP command to the ICE as indicated in block 311, and the SCE and ICE act autonomously and independent of the host or service processor. In response to the SWAP command, the ICE switches the OLA 150 SCA 180 from the 1 side to the 0 side, after all outstanding requests have been handled, in the manner described above with respect to FIG. 5. A COMPLETE signal is sent by the ICE 114 to the SCE 112, all of which is represented by block 313.

In response to the COMPLETE signal from the ICE, the SCE switches the SCA 230 from the 1 to the 0 side, previously loaded with updated information, and sends a SWITCH COMPLETE signal to the ICE and the service processor, as indicated in block 315. As shown in block 317, the ICE responds to the signal from the SCE by resetting the "inhibit request" signal and resumes normal traffic handling in response to I/O requests, as indicated in block 317. As indicated in block 319 the service processor responds to the "Complete" signal from the SCE and resets the AUTO PURGE mode in the SCE, to allow the SCE to process commands in a normal fashion, including normal operation of the cache 242. Other operations which have been inhibited such as PAGING, are resumed. It should be noted that no I/O devices were stopped or otherwise impacted in any way.

After the ICE and SCE have resumed normal operations using the new memory address information, the one of zone information tables 201, 202 and the one of the storage configuration array 205, 206 in the system area of memory, updated earlier, are switched from the inactive to the active state as indicated in block 321. Thereafter, a START command is sent to each of the processors of processor complex 101 instructing the processors to leave the PAUSE state and to fetch the updated information from the zone information table and configuration array in the system area of memory to update the corresponding storage configuration array and origin and limit array contained in each of the processors. Thereafter, the processors resume normal data handling, as indicated in block 323.

In blocks 325 through 327 the inactive copy of the storage configuration array in the SCE, the inactive copy of the origin and limit array in the ICE and the inactive copy of the zone information table and the storage configuration array in the system area are updated, to complete the storage reconfiguration.

While we have described our preferred embodiments of our invention, it will be understood that those skilled in the art, both now and in the future, may make various improvements and enhancements which fall within the scope of the claims which follow. These claims should be construed to maintain the proper protection of the invention first disclosed.

What is claimed is:

1. In a logically partitioned data processing system having a plurality of logical partitions and including a processor system performing data processing functions and a memory system comprising a plurality of memory areas, in which each of the memory areas is defined by an absolute address space of a predefined size and beginning at a predefined absolute origin address, and each partition is assigned one of the memory areas defined in terms of absolute addresses mapped into physical memory addresses, a method of adding an additional memory area of a predefined size to the memory area assigned to a selected partition, the method comprising the steps of:

adjusting the absolute origin addresses for all partitions having an absolute origin address between the absolute origin address of the selected partition and the absolute origin address of the additional memory area by a value corresponding to the size of the absolute address space of the additional memory area; and increasing the size of the absolute address space of the selected partition by a value corresponding to size of the absolute address space of the additional memory area.

2. The method in accordance with claim 1 wherein the upper limit of each absolute address space is defined by a limit address and wherein the system comprises an origin and limit array storing absolute origin address and absolute limit address information for each of the partitions and wherein the method comprises the step of storing in the origin and limit array information defining revised absolute origin and limit address information for each partition for which an absolute origin or limit address is adjusted.

3. The method in accordance with claim 1 in a system comprising a configuration array storing physical memory address information corresponding to absolute addresses and wherein the method further comprises the step of storing in the configuration array, prior to the step of adjusting the absolute origin addresses, for each partition other than the selected partition physical memory address information corresponding to physical addresses previously assigned to each of the other partitions and for the selected partition storing physical memory address information including physical memory address information corresponding to physical memory addresses previously assigned to the additional memory area, whereby absolute memory addresses are reassigned without modification of physical memory addresses.

4. The method in accordance with claim 3 and wherein the system further comprises an input/output system generating memory commands and interface circuitry connected to the memory system and to the input/output system and wherein the step of storing in the limit and origin array comprises storing revised origin and limit address information in a standby origin and limit array and the step of storing in the configuration array comprises storing physical address information in a standby configuration array in the interface circuitry.

5. The method in accordance with claim 4 and further comprising the step of enabling the system to use the information stored in the standby origin and limit array and in the standby configuration array after the step of storing.

6. The method in accordance with claim 5 wherein the input/output system generates memory commands and the interface circuitry converts absolute addresses included in the memory commands to physical memory addresses and wherein the method further comprises the step of inhibiting the converting of absolute addresses in the interface circuitry after the steps of storing in the standby origin and limit array and storing in the standby configuration array and prior to the step of enabling.

7. The method in accordance with claim 6 and further comprising the step of releasing the inhibit of the converting of absolute addresses in the interface system after the step of enabling.

8. The method in accordance with claim 7 and further comprising the step of inhibiting the processor system from performing data processing functions after the steps of storing in the standby origin and limit array and storing in the standby configuration array and prior to the step of enabling.

9. The method in accordance with claim 8 and further comprising the step of releasing the inhibit of the processor system after the step of enabling.

10. The method in accordance with claim 9 and further comprising the step of executing a program instruction in the processor system to perform the steps of storing address information in the standby origin and limit array and in the standby configuration array and further to transmit a control signal to the interface circuitry.

11. The method in accordance with claim 10 in a system wherein the processor system comprises at least one processor assigned to a partition and including a cache containing information to be stored in the memory system and the method further comprises the step of causing information contained in the cache to be transferred to the memory system before enabling the system to use the information stored in the standby origin and limit array and in the standby configuration array.

12. The method in accordance with claim 11 wherein the step of enabling comprises enabling the output gating of information from the standby origin and limit array and the standby configuration array in the interface circuitry in response to the control signal.

13. A logically partitioned data processing system forming a plurality of logical partitions, the system comprising:

a processor system;

a memory system in which designated blocks of memory are each assigned to one of the logical partition; and first and second addressable origin address tables each table having a plurality of origin address locations and an origin address stored in each of the origin address locations defining an origin in the memory system for one of the logical partitions, each of the origin address locations corresponding to one of the partitions;

origin table address circuitry operative to address the origin tables at selected origin address locations;

origin table output circuitry connected to the origin tables and defining one of the origin tables as active and the other of the origin tables as standby and operative to gate an origin address from the active origin table;

the processor system operative upon execution of a program instruction to store revised origin address information in address locations of the standby origin table and to cause the addressing of the origin tables to be suspended and cause the standby state to be defined for the one of the origin tables and the active state for the other of the origin tables while the addressing of the origin tables is suspended and to subsequently allow addressing of the origin tables.

14. The system in accordance with claim 13 wherein the processor system, upon execution of the program instruction, generates a control signal and the system further comprises an input/output system and interface circuitry connected to the input/output system and the memory system, the interface circuitry comprising control circuitry responsive to the control signal to autonomously inhibit the addressing of the origin tables by the origin table address circuitry and to subsequently control the origin output circuitry to define the standby state for the one of the origin tables and to define the active state for the other of the origin tables and to thereafter enable addressing of the origin tables by the origin table address circuitry.

15. The system in accordance with claim 14 wherein the interface circuitry further comprises adder circuitry connected to the origin table output circuitry and to the input/output system and operative to add origin address information from the origin table output circuitry to other address information received from the input/output system to generate a modified memory address and transmit circuitry connected to the adder circuit and the memory system for transmitting the modified memory address.

16. The system in accordance with claim 15 wherein the origin table further comprises limit address information stored in association with each origin address, the limit address defining a limit of an address range for a partition associated with the origin address in association with which the limit address information is stored.

17. The system in accordance with claim 16 wherein the processor system is further responsive to the program instruction to store revised limit address information in the origin tables.

18. The system in accordance with claim 15 and further comprising memory interface circuitry connected to the transmit circuitry and the memory system, the memory interface comprising first and second memory address tables each having a plurality of address locations and a memory address stored in each address location of the first and second tables and memory address table addressing circuitry for addressing the memory address tables at selected locations and memory address table output circuitry connected to the memory tables and defining one of the memory tables as active and the other of the memory tables as standby and operative to gate a memory address from the active memory table to the memory system, wherein the processor system is further operative upon execution of the program instruction to store revised memory address information in the address locations of the standby memory address table and to cause the addressing of the memory address tables to be suspended and cause the standby state to be defined for the one of the memory address tables and the active state for the other of the memory address tables while addressing of the memory address tables is suspended and to subsequently allow addressing of the memory address tables.

19. The system in accordance with claim 18 wherein the memory interface circuitry further comprises control circuitry responsive to the control signal to autonomously inhibit the addressing of the memory address tables by the memory address table address circuitry and to subsequently control the memory address output circuitry to define the standby state for the one of the memory address tables and to define the active state for the other of the memory address tables and to thereafter enable addressing of the memory address tables by the memory table address circuitry.

20. The system in accordance with claim 15 wherein the input/output interface further comprises circuitry for generating an invalid address signal when the modified address exceeds the limit address associated with origin address from which the modified address is generated.

* * * * *